United States Patent [19]

Urushidani et al.

[11] Patent Number: 5,281,129

[45] Date of Patent: Jan. 25, 1994

[54] COMBUSTION APPARATUS AND CONTROL METHOD THEREFOR

[75] Inventors: Haruo Urushidani, Hitachi; Seisaku Takihana, Ibaraki; Kazuhiko Kumata, Katsuta; Akira Shimura; Osamu Arai, both of Hitachi; Takeshi Iwamiya; Hiraku Ikeda, both of Katsuta, all of Japan

[73] Assignee: Hitachi, Ltd., Tokyo, Japan

[21] Appl. No.: 840,813

[22] Filed: Feb. 25, 1992

[30] Foreign Application Priority Data

Feb. 26, 1991 [JP] Japan .................................. 3-030655

[51] Int. Cl.$^5$ ............................................... F23N 5/00
[52] U.S. Cl. .......................................... 431/12; 431/14; 431/59
[58] Field of Search ..................... 431/12, 4, 5, 10, 14, 431/42, 59; 60/39.28

[56] References Cited

U.S. PATENT DOCUMENTS

| | | | |
|---|---|---|---|
| 3,766,734 | 10/1973 | Jones . | |
| 4,111,637 | 9/1978 | Hillman, II | 431/12 |
| 4,369,026 | 1/1983 | Morgan et al. | 431/12 |
| 4,488,867 | 12/1984 | Beltrami et al. | 431/12 |
| 4,659,306 | 4/1987 | Altemark et al. | 431/12 |
| 4,815,965 | 3/1989 | Likins, Jr. | 431/12 |
| 4,993,222 | 2/1991 | Iwai et al. | 431/12 X |

FOREIGN PATENT DOCUMENTS

| | | |
|---|---|---|
| 0055852 | 12/1981 | European Pat. Off. . |
| 0222173 | 10/1986 | European Pat. Off. . |
| 60-66020 | 4/1985 | Japan . |
| 88/08075 | 6/1987 | PCT Int'l Appl. . |

Primary Examiner—Larry Jones
Attorney, Agent, or Firm—Antonelli, Terry, Stout & Kraus

[57] ABSTRACT

To provide a combustion apparatus and a controlling method therefor which are capable of preventing the flame-out and backfire of the flame of a premix burner and the increase of the NOx concentration attributable to the change of the calorific value of the fuel, the amount of air supplied to the premix burner is so controlled as to achieve a low NOx within the range in which the premix burner effects a stable combustion in accordance with the calorie of the fuel supplied to the combustion apparatus, and a change of the output of the combustion apparatus attributable to this control of the amount of air is compensated by the control of the amount of the fuel supplied to the diffusion burner.

11 Claims, 8 Drawing Sheets

COMBUSTION APPARATUS AND CONTROL METHOD THEREFOR

FIELD OF THE INVENTION

This invention relates to improvements in combustion apparatus and controlling method therefore, and, more particularly, to a combustion apparatus suitable for application to a gas turbine and comprising a premix burner and a diffusion burner.

BACKGROUND OF THE INVENTION

As shown in FIG. 2, a conventional combustion apparatus applied generally to the gas turbine has usually been equipped with a diffusion burner $C_1$ at the head thereof and with a premix burner $C_2$ downstream of this diffusion burner as shown in FIG. 2.

Thus, the burners have been combined in two stages for the purpose of obtaining a combustion apparatus capable of effecting a low NOx and stable combustion due to the diffusion combustion which achieves a high combustion stability and the premix combustion which achieves a high reduction of NOx concentration although the stable combustion range therein is narrow.

This type of two-stage combustion apparatus comprises an antechamber or diffusion combustion chamber 1, $F_1$ nozzles 2 for diffusion combustion, a main chamber or premix combustion chamber 3, $F_2$ nozzles 4 for premix combustion, and a combustion air supply section. Particularly, in order to control the flow rate of premixed air $A_2$ through the $F_2$ nozzles 4 the stable combustion range of which is narrow, an internal flow rate control (IFC), 5 is provided in this combustion air supply section.

In the combustion apparatus having such construction, fuel-air ratio (the ratio of fuel amount to air amount) is controlled so as to be maintained at a constant value by changing the air flow rate in response to the fuel flow rate determined beforehand for the operation of the gas turbine as disclosed in Japanese Patent unexamined Publication No. 60-66020 as well. Namely, the fuel flow rate is changed in accordance with the change of load and the distribution of air in the burners is also changed in accordance with the change of this fuel flow rate so as to set the fuel-to-air ratio at the predetermined value, thereby realizing the stabilization of the combustion and the reduction of the NOx.

FIG. 3 shows the relationship between the fuel-air ratio and the NOx, in which the abscissa represents the fuel-air ratio and the ordinate represents the NOx relative value and which illustrates the difference between the diffusion combustion and the premix combustion. The theoretical fuel-air ratio of methane is 0.058, and gas turbine burners are usually used at fuel-air ratios less than 0.058. In operation, the diffusion combustion which is stable over the wide operation range is utilized from the start-up to the low-load operation of the gas turbine, and the premix combustion and the diffusion combustion are utilized simultaneously from the low-load operation to the rated-load operation, so as to reduce the NOx. On that occasion, since the range of the fuel-air ratio in which the premix combustion is effected completely (operation range of $F_2$) is narrow, the fuel-air ratio is set to be in the operation range by controlling the flow rate of air $A_2$ by the IFC 5 of FIG. 2. Total combustion air A of FIG. 2 is divided into a flow rate of air $A_1$ flowing through the antechamber 1, a flow rate of air $A_2$ flowing through the main chamber 3 and a flow rate of air $A_3$ flowing into through dilution holes 6. When the IFC 5 is opened, the amount of air $A_2$ is increased and the amounts of airs $A_1$ and $A_3$ are decreased, while when it is closed, the amount of air $A_2$ is decreased and the amounts of airs $A_1$ and $A_3$ are increased.

From the viewpoint of efficient use of energy, there arises a problem of the treatment of vaporized gas called BOG gas (boil-off gas) generated in power generation using LNG. The calorific content of the BOG gas is lower than that of the LNG due to the difference in boiling points of the fuel components. If the BOG gas is not discharged to the outside periodically, the internal pressure of an LNG tank is increased to bring about damage. To cope with this, the BOG gas is treated as being mixed with the LNG in the existing circumstances. This results in a sudden change of the calorific value in the LNG power plant. It is therefore difficult to realize the stable combustion and the reduction of the NOx by controlling the fuel flow alone in the conventional manner.

In the above-described prior art, change of the fuel flow rate due to load change has been taken into consideration, and however, change of the fuel characteristics such as the calorific value has not been taken into consideration. Therefore, in case of effecting the lean premix combustion and the two-stage combustion including the diffusion combustion and the premix combustion with the low NOx burner or the like, if the calorific value is changed during the constant fuel flow operation, a combustion flame is made unstable so as to cause a flame-out, or conversely a backfire of the premix flame occurs thereby increasing, increase the production of the NOx and the like. Further, this gives rise to a problem that if the calorific value of the supplied fuel is changed drastically during the constant fuel flow rate operation or the constant load operation, the load is changed greatly. Change of the calorific value of the fuel is the problem caused at the time of treating a low-calorie gas BOG gas, which is vaporized to above the LNG, in the LNG plant.

In order to realize a stable combustion over the wide range from no-load operation to the rated-load operation, such control as shown in FIG. 4 has been performed. In this diagram, the abscissa represents the fuel command signal corresponding to the load ranging from the no load to the rated load and the ordinate represents the flow rate of fuel through the $F_1$ and $F_2$ nozzles 2 and 4 and the opening of the IFC 5. On the lower load side, the flow rate of fuel is small and a lean combustion is effected, so that the diffusion combustion is utilized only due to the $F_1$ nozzles 2. The IFC 5 is fully opened to reduce the air in the ante-chamber 1 so that the fuel-air ratio is increased to realize the stable combustion. It is necessary to reduce the ignition load of the $F_2$ nozzles 4 for the purpose of expanding the range of the operation load. Therefore, by closing the IFC 5 from the point 1 to the point 2 as shown in FIG. 4, the flow rate of air $A_2$ through the main chamber 3 is reduced so that the combustion can be effected in a stabilized manner with the fuel supplied from the $F_2$ nozzles 4 at the time of changing over the fuel. At that time, the flow rate of air $A_1$ through the antechamber 1 is increased so far as the combustion can be effected in a stabilized manner with the flow rate of the fuel flowing through the $F_1$ nozzles 2 at the time of the changing-over, and the load at that time is regarded as the minimum change-over load.

After the ignition at the $F_2$ nozzles 4, the opening of the IFC 5 is increased, as the load is increased to the rated load in due order through A→B→C, so that the flow rate of air $A_2$ through the main chamber 3 is increased and, at the same time, the fuel supplied from the $F_2$ nozzles 4 is increased, thereby setting the fuel-air ratio to be in the operation range shown in FIG. 3 so as to reduce the NOx.

In controlling the fuel, the fuel command signal is sent to an IFC opening setting device 7 so as to operate an IFC driving device 8 as shown in FIG. 2.

SUMMARY OF THE INVENTION

An object of the present invention is to solve the above-described problems, and further, to provide a combustion apparatus capable of dealing with various types of fuel.

To this end, in case of distributing the diffusion combustion air and the premix combustion air, the composition or calorific value of the fuel is measured before it is supplied to the burners and the air distribution is changed so as to minimize the NOx in the premix combustion zone within the stable range, and the change of the load attributable to the change of the calorific value is controlled by the supply of the fuel to the diffusion combustion zone.

Further, in case of controlling the fuel-air ratio by making the combustion air bypass downstream of the burner outlet, the amount of air bypassed is so as to minimize the NOx in the premix combustion zone in accordance with the change of the calorific value, the change of the load attributable to the change of the calorific value is controlled by the supply of the fuel to the diffusion combustion zone.

The calorific value of the fuel is measured by a means or device for measuring the calorific value before the fuel flows into gas turbine burners. Further, a means or device for regulating the air flow rate distribution of the burners operates to change the distribution of air in accordance with the change of the flow rate of the design fuel so as to keep the fuel-air ratio at the design value. It is noted that the fuel is designed to be used in several conditions classified taking the calorific value as the parameter so as to control the flow rate of air to be changed in accordance with the measured calorific value while keeping the flow rate of the fuel constant.

Namely, when the calorific value is changed to be decreased from its central value, the flow of air is decreased. To the contrary, when the calorific value is increased, the flow of air is increased.

In controlling the distribution of the fuel, the same amount of the fuel as supplied before the calorific value is changed is supplied to the premix combustion zone and the flow of the fuel supplied to the diffusion combustion zone is changed so as to increase/decrease the fuel used to correct the change of the load. When the calorific value is decreased the amount of the fuel supplied is increased, and when the calorific value is increased the amount of the fuel supplied is decreased, thereby keeping the load constant.

The foregoing and other objects, features as well as advantages of the invention will be made clearer from the description hereafter of a preferred embodiment referring to the drawings.

DETAILED DESCRIPTION OF PREFERRED EMBODIMENT

Figure 1:
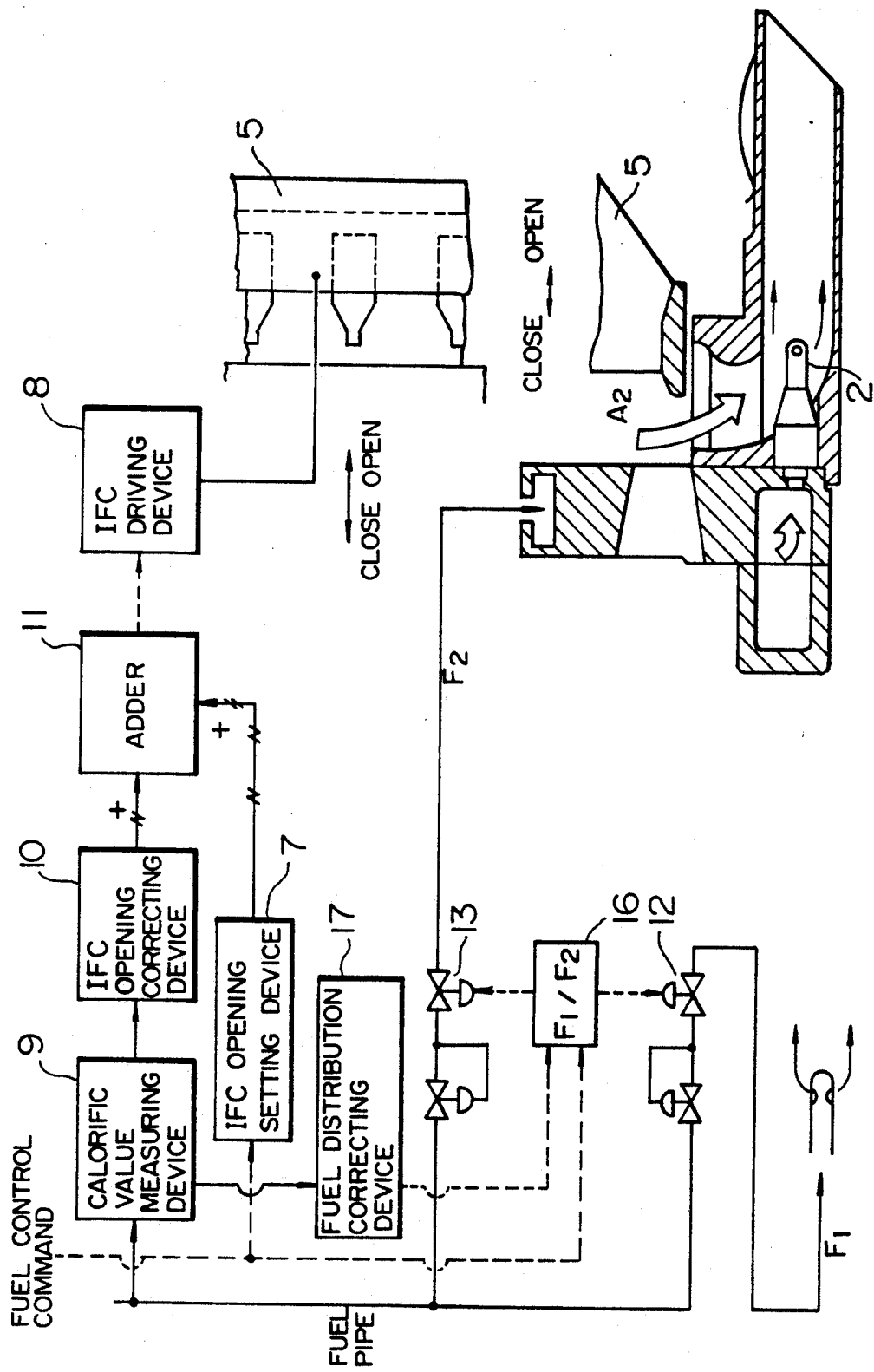
FIG. 1 is a diagrammatic view of portions of a combustion apparatus according to a preferred embodiment of the present invention.
Figure 2:
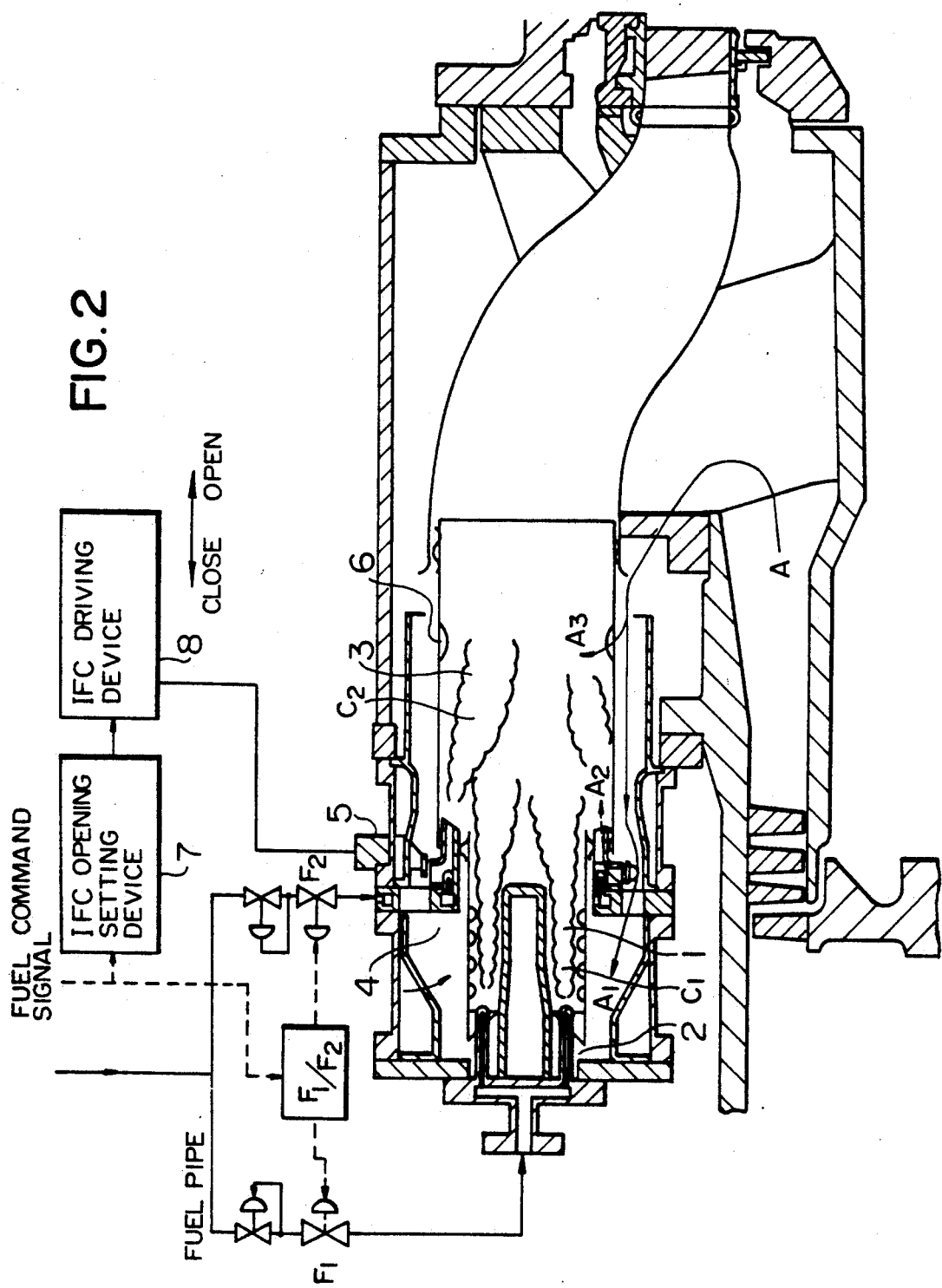
FIG. 2 is a vertically sectional side view of a conventional combustion apparatus.
Figure 3:
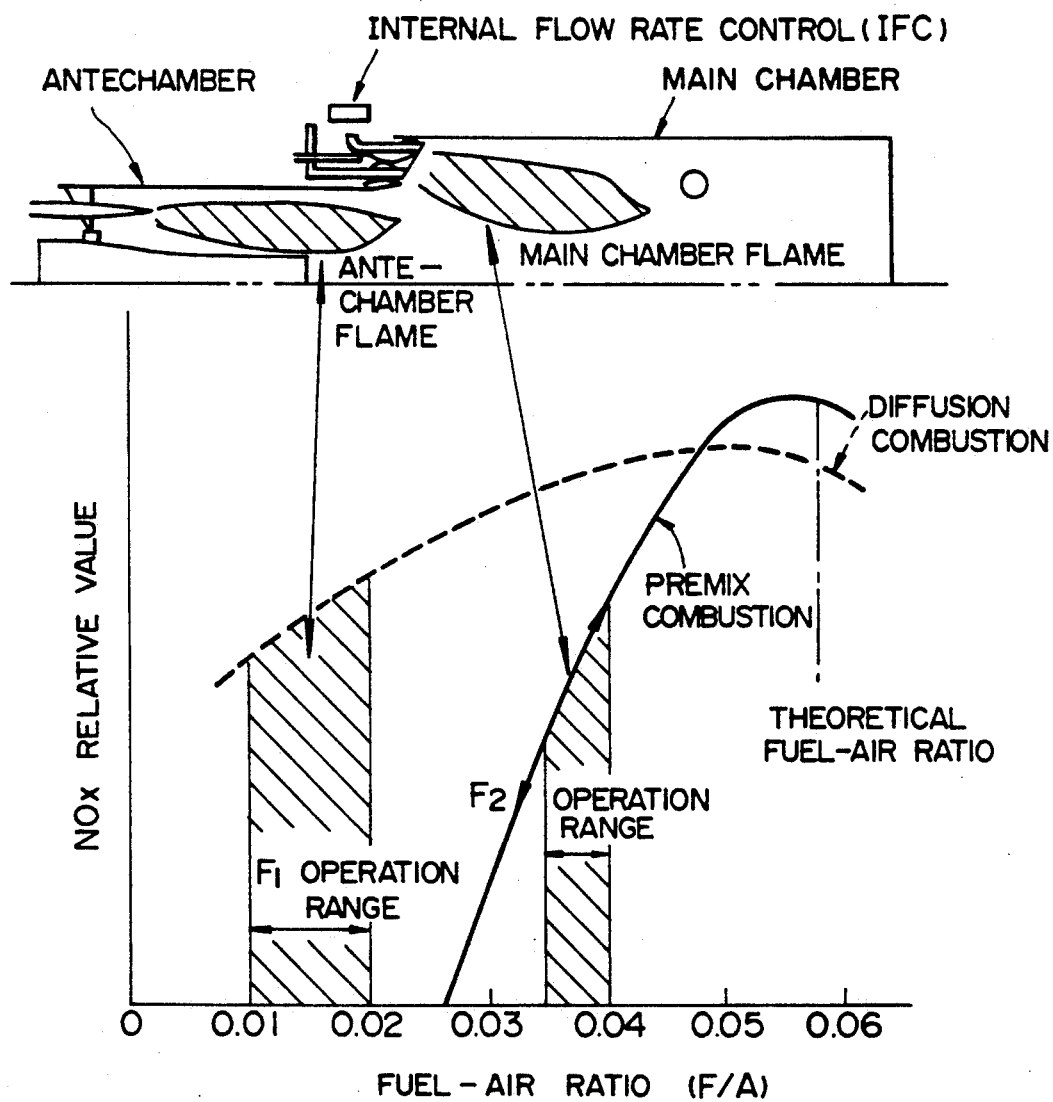
FIG. 3 is a graphical illustration of the relationship between the NOx and the fuel-air ratio of the combustion apparatus.

In the embodiment of FIG. 1, fuel is sampled on the upstream side of an $F_1$ fuel control valve 12 and an $F_2$ fuel control valve 13 and its calorific value is measured by a calorific value measuring device 9. Deviation from the preset value is supplied from the measuring device 9 to an IFC opening correcting device 10. A signal from the IFC opening correcting device 10 and a signal from an IFC opening setting device 7 based on the fuel control command are added by an adder 11 in which the fuel signal is corrected for the calorific value. Then, an IFC driving device 8 is operated to open/close an IFC 5 so as to set the ratio of air $A_2$ to the fuel through $F_2$ fuel nozzles 2 at a target value.

On the other hand, the signal from the calorific value measuring device 9 is also sent to a fuel distribution correcting device 17 so that the flow of fuel used for correcting increase/decrease of the output attributable to the change of the calorific value is so controlled as to be distributed only to the $F_1$ nozzles 2 for the diffusion combustion, while the flow rate of the fuel $F_2$ makes no contribution to the correction for the power.

Figure 5:
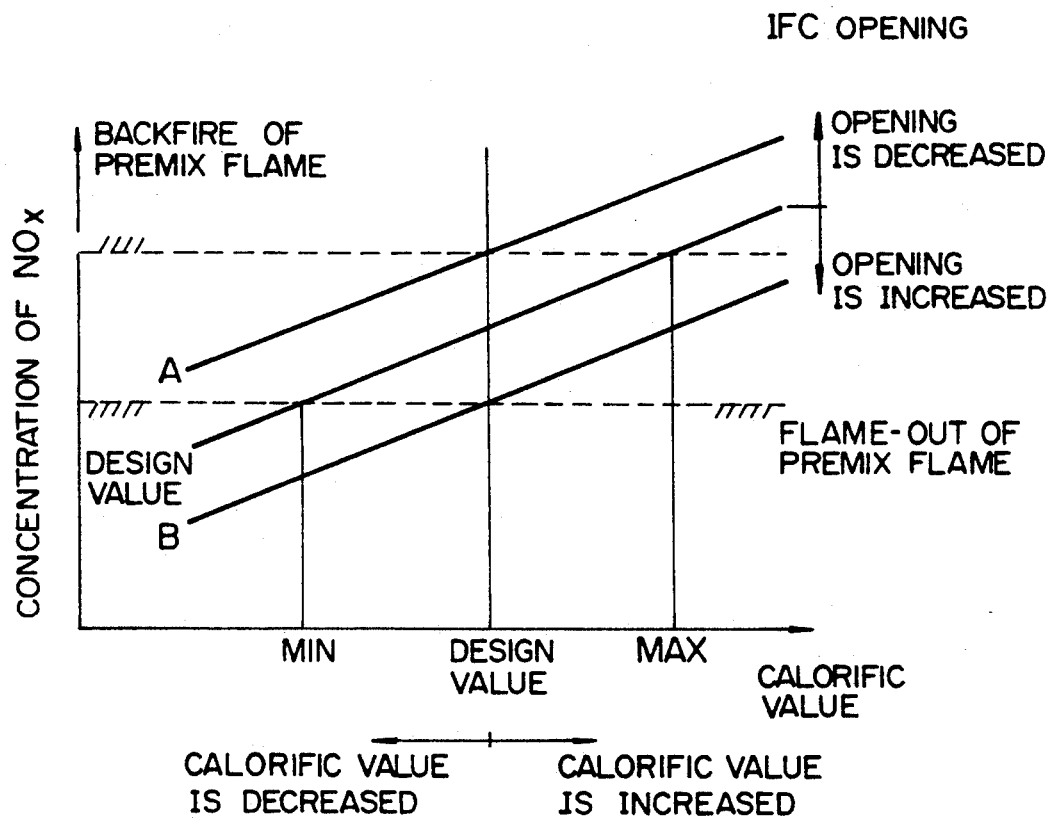
FIG. 5 is a graphical illustration of a characteristic relationship between the calorific value and the NOx contained in the combustion.

FIG. 5 shows the relationship between the calorific value and the concentration of the NOx taking the IFC opening as a parameter, in which the abscissa represents the calorific value of the fuel and the ordinate represents the concentration of the NOx. In case the calorific value is changed at the design point during the operation, if only the flow rate of the fuel is controlled as conventional, the calorific value reaches the premix flame blowout limit when the calorific value is not greater than the minimum value because the IFC opening is not changed, resulting in a flame-out. To the contrary, in case that the calorific value is increased, the NOx content is increased. When the calorific value is further increased to reach the maximum, it exceeds the premix flame backfire limit so as to cause a backfire, resulting in the possibility of the burnout of the $F_2$ nozzle 2.

According to the present invention, when the calorific value is shifted to the lower value, the IFC opening is shifted from the design IFC opening to the smaller side until it is set at A, thereby preventing the blowout. To the contrary, when the calorific value is increased, the IFC opening is shifted to the larger side until it is set at B, thereby keeping the NOx content low as well as preventing the backfire.

Figure 6:
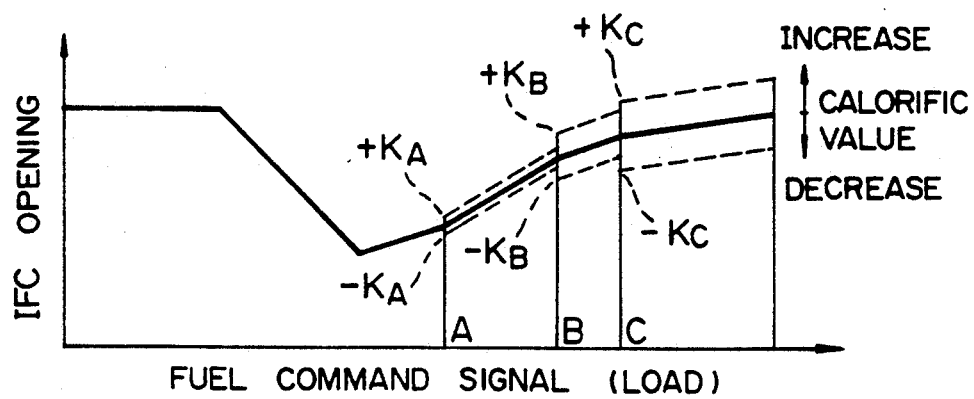
FIG. 6 is a graphical illustration of a characteristic relationship between the fuel command signal and the flow rate of air in the combustion apparatus according to the preferred embodiment of the present invention.

In FIG. 6, the abscissa represents the fuel command signal and the ordinate represents the IFC opening. For the same fuel command signal, the IFC opening is increased/decreased based on the measured value of the change of the calorific value. On the lower load side, since the flow rate of the fuel is small, the amount of correction for the flow rate of air attributable to the change of the calorific value is also small. Consequently, the IFC opening is controlled to be in the range of $+K_A$ to $-K_A$ as shown at A on the abscissa of FIG. 6. As the load is increased and hence the flow rate of the fuel is increased, the amount of correction for the flow of air required becomes larger even for the same change of the calorific value, and therefore, the amount of correction is increased as being in the range of $+K_B$ to $-K_B$ at B on the abscissa and in the range of $+K_C$ to $-K_C$ at C on the abscissa.

Figure 9:
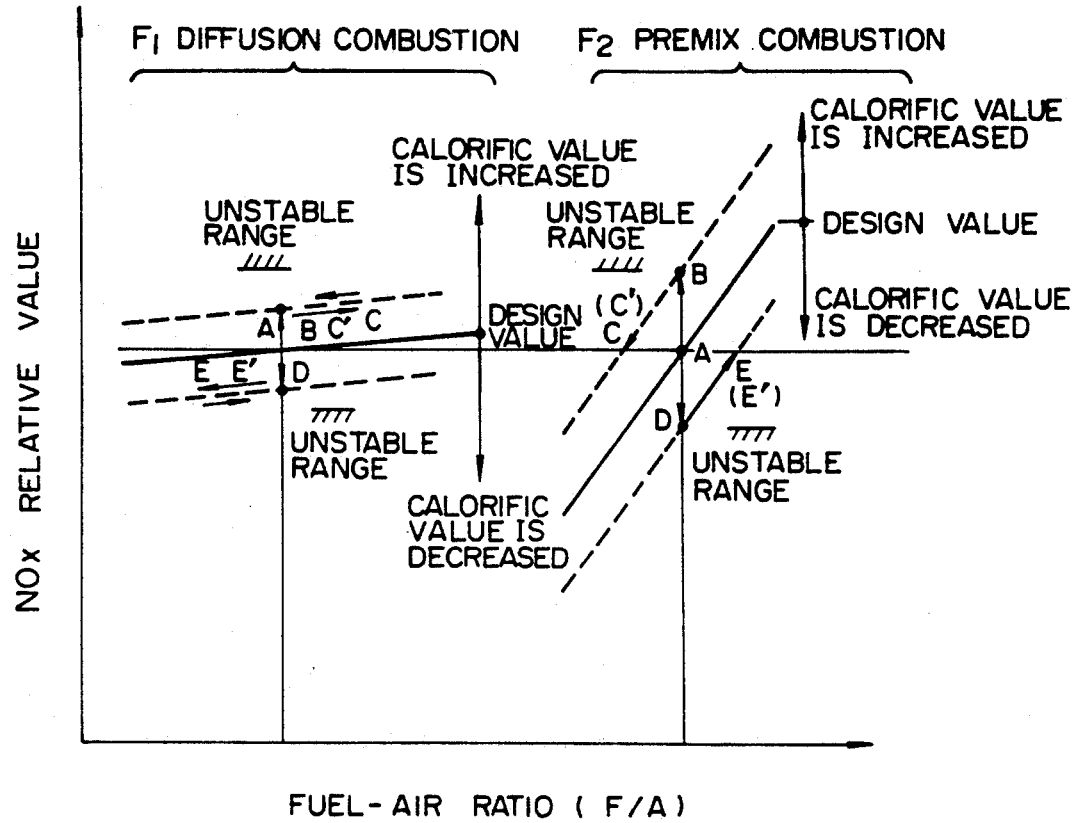
FIG. 9 is a graphical illustration of the relationship between the fuel-air ratio and the NOx in the combustion apparatus according to the preferred embodiment of the present invention.
Figure 10:
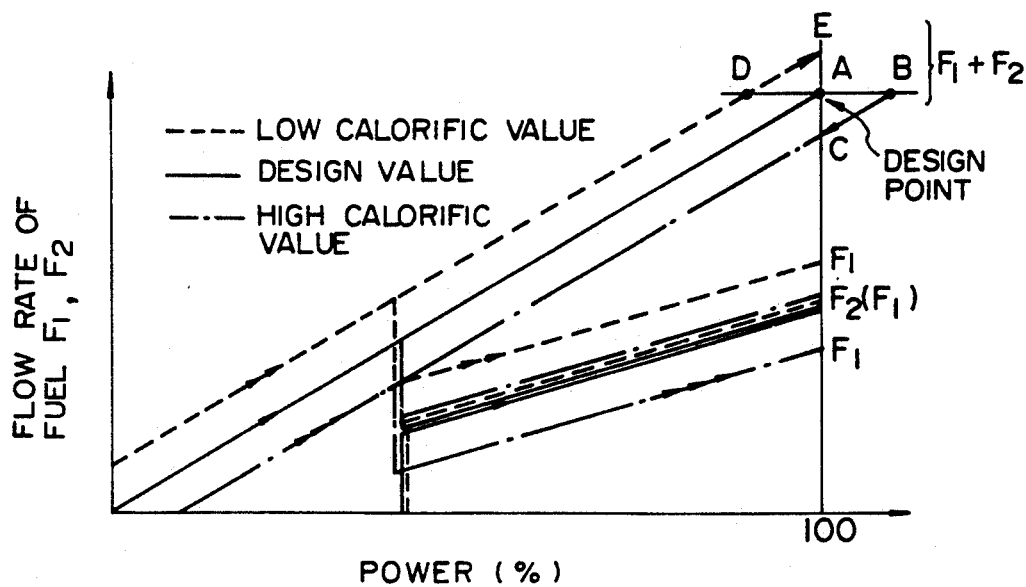
FIG. 10 is a graphical illustration of the relationship between the power and the fuel distribution in the combustion apparatus according to the preferred embodiment of the present invention.

FIG. 10 shows the relationship between the power and the flow rate of fuel taking the calorific value as a parameter, in which the abscissa represents the power and the ordinate represents the flow rates of fuels $F_1$ and $F_2$. When the calorific value is reduced at the time of 100% power, the power is reduced from the design point A to a point D. When it is intended to operate at constant power, it is necessary to increase the fuel by an amount corresponding to the reduction of the calorific value so as to reach a point E. According to the present invention, when this is the case, the fuel increased to control the change of the power attributable to the change of the calorific value is used for the stable $F_1$ diffusion combustion alone, while for the $F_2$ premix combustion, only the flow rate of air is changed at once when the calorific value is changed, thereby setting the fuel-air ratio properly at which the stable and low NOx combustion can be effected. FIG. 9 shows the effect of this controlling method, in which the abscissa represents the fuel-air ratio and the ordinate represents the NOx relative value. In case that the calorific value of the fuel is reduced during the operation at the design point A, since the $F_1$, $F_2$ NOx is shifted to the point D in this control, the IFC 5 of FIG. 1 is changed to the closed position so as to reduce the flow of air $A_2$ and increase the flow of air $A_1$. As shown in FIG. 9, the $F_2$ premix combustion is shifted to the point E at which the stable and low NOx combustion can be effected. The $F_1$ diffusion combustion is shifted, in correspondence to the increase of the air $A_1$, from the point D to the point E which is nearer to the unstable range, and however, there arises no problem because the range of the stable fuel-air ratios is wider as compared with the $F_2$ premix combustion. Further, since the amount of the fuel corresponding to the shortage required for maintaining the power constant is appropriated for the $F_1$ diffusion combustion zone, it is shifted from the point E to the point E' at which a more stable combustion can be effected.

In the way described above, it is possible to realize a stable and low NOx combustion even when the calorific value is changed.

Figure 7:
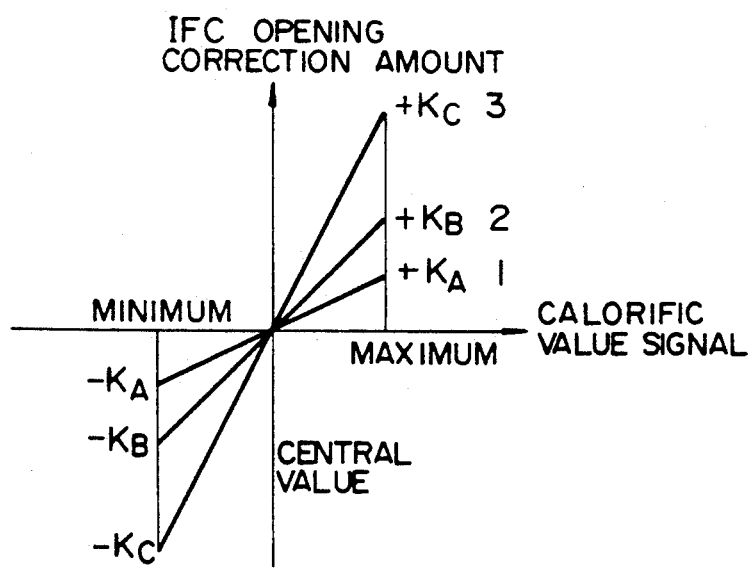
FIG. 7 is a diagram showing the relationship between the IFC opening correction amount and the calorific value signal.

In FIG. 7, the abscissa represents the calorific value signal and the ordinate represents the IFC opening correction amount. The range of the fuel command signal is taken as parameter that is so set as being 1 between the points A and B, 2 between the points B and C and 3 between the point C and the point of the rated load, as shown in FIG. 6, while giving consideration to the increase of the sensitivity in the amount of correction for the flow rate of air attributable to the increase of the flow rate of the fuel.

Figure 4:
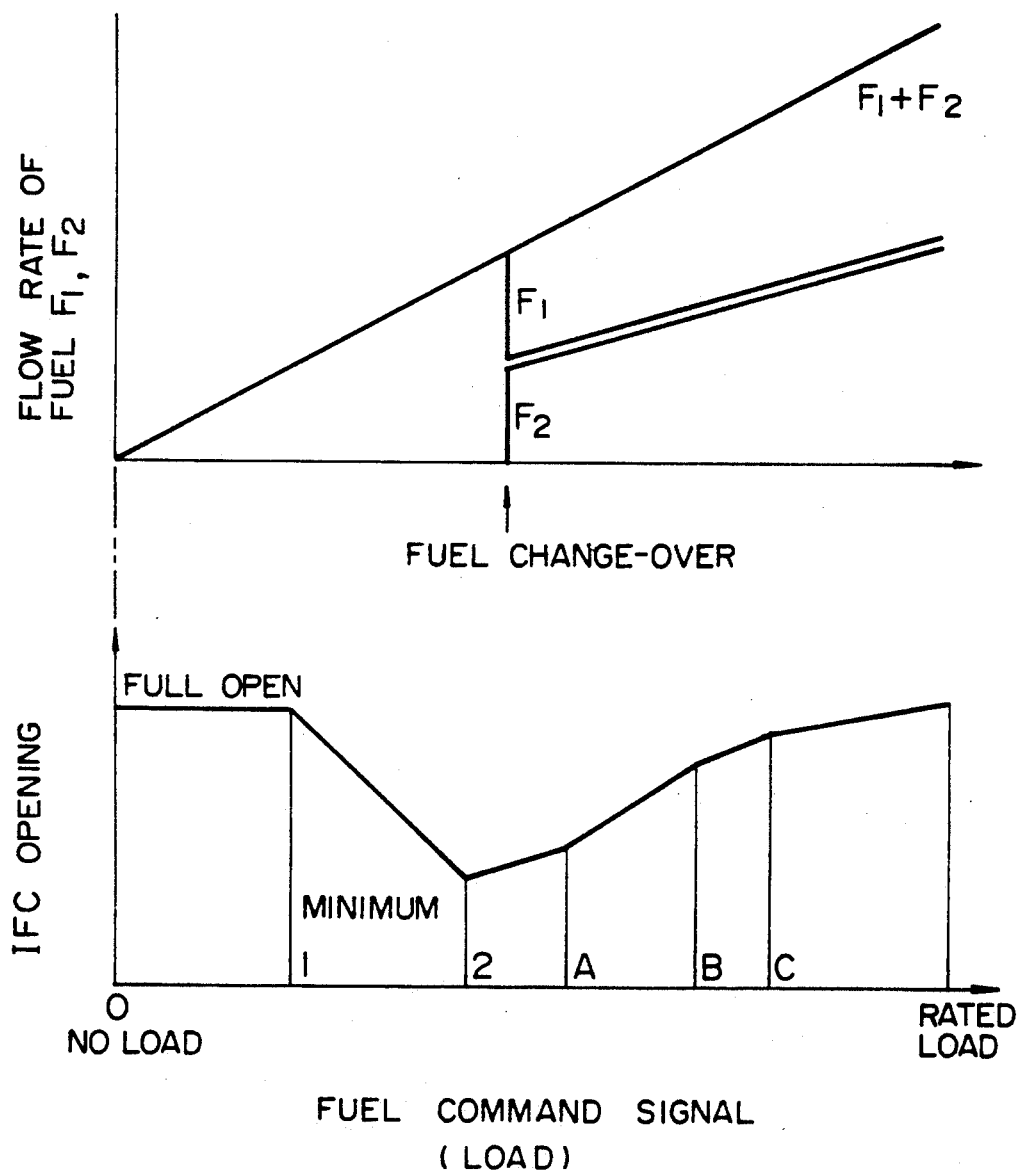
FIG. 4 is a graphical illustration of the relationship between the fuel command signal and the flow rate of fuel as well as the flow rate of air in the conventional combustion apparatus.
Figure 8:
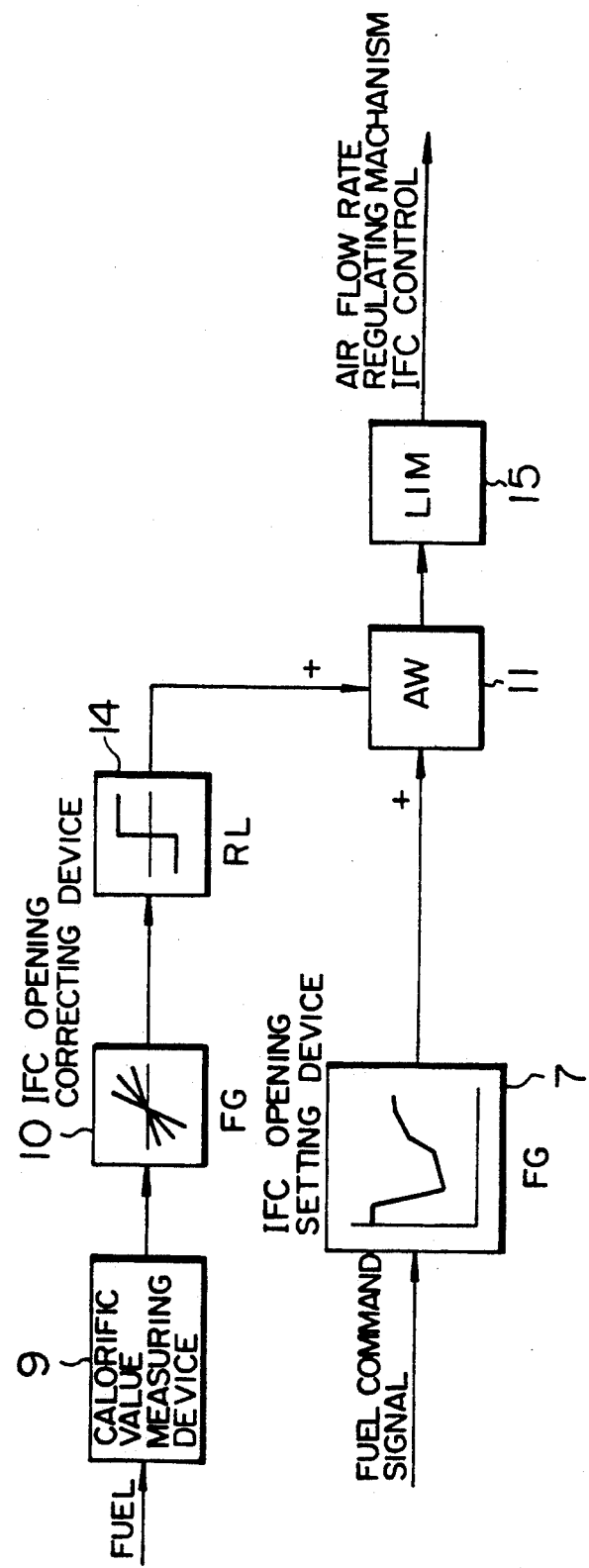
FIG. 8 is a block diagram of the operation of the combustion apparatus according to the present invention.

FIG. 8 is a control block diagram of the present invention. The IFC opening setting device 7 is the conventional setting device of FIG. 4 and the IFC opening correcting device 10 is the one shown in FIG. 7. In order to limit the IFC opening/closing speed, the signal is sent to the adder 11 through a rate limit 14 provided additionally. The signal is passed through a limiter 15 before it serves as the IFC control signal so as to protect the issue of such command that is beyond the IFC full open position.

According to the present invention, it is possible to prevent the blowout and backfire of the premix flame, increase of the NOx concentration and the like which are caused due to the change of the calorific value of the fuel, and it is also possible to improve the reliability on the treatment of BOG gas in the LNG firing combined cycle power plant.

What is claimed is:

1. A method for controlling, in a steady-state operating condition, a combustion apparatus which has a premix burner and a diffusion burner, both burners being supplied with fuel from a common fuel supply, the method comprising the steps of:

measuring a calorific value of fuel supplied to said combustion apparatus;

increasing, when the measured calorific value is greater than a reference value, an amount of air supplied to the premix burner so as to achieve a low NOx within a range of stable combustion thereof; and decreasing an amount of fuel supplied to the diffusion burner to supplement a change of total power of said combustion apparatus attributable to an increase in the calorific value of the fuel.

2. A method according to claim 1, further comprising the step of decreasing an amount of air supplied to the diffusion burner according to the increase of the amount of air supplied to the premix burner.

3. A method for controlling, in a steady-state operating condition, a combustion apparatus which has a premix burner and a diffusion burner, both burners being supplied with fuel from a common fuel supply, the method comprising the steps of:

measuring a calorific value of fuel supplied to said combustion apparatus;

decreasing, when the measured calorific value is lower than a reference calorific value, an amount of air supplied to the premix burner so as to achieve a low NOx within a range of stable combustion thereof; and increasing an amount of fuel supplied to the diffusion burner to supplement a change of total power of said combustion apparatus attributable to a decrease in the calorific value of the fuel.

4. A method according to claim 3, further comprising the step of increasing an amount of air supplied to the diffusion burner in accordance with a decrease in the amount of air supplied to the premix burner.

5. A method for controlling, in a steady-state operating condition, a combustion apparatus having a premix burner and a diffusion burner, both burners being supplied with fuel from a common fuel supply, the method comprising the steps of:

measuring a calorific value of fuel supplied to said combustion apparatus;

at least one of increasing or decreasing, when the measured calorific value is one of greater or less than a reference value, an amount of air supplied to the premix burner while maintaining an amount of fuel supplied thereof constant, so as to achieve a low NOx within a range of stable combustion thereof; and one of decreasing or increasing an amount of fuel supplied to the diffusion burner to supplement a change of total power of said combustion apparatus attributable to the increase or decrease in the calorific value of the fuel.

6. A method according to claim 5, further comprising the step of one of decreasing or increasing an amount of air supplied to the diffusion burner in accordance with one of an increase or decrease in the amount of air supplied to the premix burner.

7. A method for controlling, in a steady-state operating condition, a combustion apparatus including a premix burner and a diffusion burner, both burners being supplied with fuel from a common fuel supply, the method comprising the steps of:

measuring a calorific value of fuel supplied to said combustion apparatus;

one of decreasing or increasing, when the measured calorific value of the fuel is one of higher or lower than a reference value, a ratio of an amount of air supplied to the premix burner with respect to an amount of air supplied thereof so as to achieve a low NOx within a range of stable combustion thereof; and one of decreasing or increasing an amount of fuel supplied to the diffusion burner to supplement a change of total power of said combustion apparatus attributable to the increase or decrease in the calorific value of the fuel.

8. A method according to claim 7, further comprising the step of one of increasing or decreasing a ratio of an amount of fuel supplied to the diffusion burner with respect to an amount of air supplied thereto in accordance with one of an increase or decrease of a fuel-to-air ratio for the premix burner.

9. A combustion apparatus including a premix burner and a diffusion burner with the premix burner and diffusion burner being supplied with fuel from a common fuel supply, said apparatus comprising:

a calorific value measuring device for measuring a calorific value of fuel to be supplied to the combustion apparatus;

a control device for controlling one of an increase or decrease of an amount of air supplied to the premix burner in accordance with one of an upward or downward change of a detection value of the calorific value of the measuring device so as to allow the premix burner to effect a low NOx combustion within a range of stable combustion; and another control device for controlling one of a decrease or increase in an amount of fuel supplied to the diffusion burner so as to supplement a change of the power or the combustion apparatus attributable to the upward or downward change of said calorific value of the fuel.

10. A combustion apparatus including a diffusion burner and a premix burner, said diffusion burner and said premix burner being supplied with fuel from a common fuel supply, and an air supply regulating device for regulating an amount of air supplied in an air supply system for the premix burner, said apparatus comprising:

a fuel composition monitoring device provided in a fuel supply system for the premix burner for measuring a calorific value of a fuel supplied and for issuing a command signal in accordance with the calorific value measured;

a control device disposed in the air supply regulating device of the premix burner for receiving the command signal and controlling, in accordance with the command signal, the air supply regulating device so as to control one of an increase or decrease in an amount of air supplied to the premix burner to effect combustion within a stable range while achieving a low NOx; and a fuel control device disposed in a fuel supply system for the diffusion burner for controlling one of an increase and decrease of an amount of fuel to supplied to the diffusion burner so as to supplement a change of the power of the combustion apparatus attributable to the change of the calorific value of the fuel.

11. A combustion apparatus including a diffusion burner and a premix burner, said diffusion burner and said premix burner being supplied with fuel from a common fuel supply, and an air supply regulating device for regulating an amount of air supplied in an air supply system for the premix burner, said apparatus comprising:

a fuel composition monitoring device provided in a fuel supply system for the premix burner for measuring a calorific value of a fuel supplied and for issuing a signal corresponding to the calorific value measured;

a control device disposed in the air supply regulating device for the premix burner for receiving the command signal and controlling one of an increase or decrease in an amount of fuel supplied to the premix burner in accordance with said signal so as to determine an amount of air supplied that allows the premix burner to effect combustion within a stable range while achieving a low NOx; and a fuel control device disposed in a fuel supply system for the diffusion burner for controlling one of an increase and decrease of a fuel supplied so as to supplement a change of the power of the combustion apparatus attributable to the change of the calorific value of the fuel.

* * * * *